United States Patent
Gupta et al.

(10) Patent No.: US 11,851,063 B2
(45) Date of Patent: Dec. 26, 2023

(54) SYSTEMS AND METHODS FOR PROTECTING A VEHICLE AT AN INTERSECTION

(71) Applicant: Toyota Motor Engineering & Manufacturing North America, Inc., Plano, TX (US)

(72) Inventors: Rohit Gupta, Santa Clara, CA (US); Ziran Wang, San Jose, CA (US); Yanbing Wang, Nashville, TN (US); Kyungtae Han, Palo Alto, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 307 days.

(21) Appl. No.: 17/411,831

(22) Filed: Aug. 25, 2021

(65) Prior Publication Data

US 2023/0065859 A1    Mar. 2, 2023

(51) Int. Cl.
*B60W 30/18* (2012.01)
*B60W 30/09* (2012.01)
*B60W 50/14* (2020.01)

(52) U.S. Cl.
CPC ...... *B60W 30/18154* (2013.01); *B60W 30/09* (2013.01); *B60W 50/14* (2013.01);
(Continued)

(58) Field of Classification Search
CPC .......... B60W 30/18154; B60W 30/09; B60W 50/14; B60W 2420/42; B60W 2420/52;
(Continued)

(56) References Cited

U.S. PATENT DOCUMENTS

| 6,643,578 B2 | 11/2003 | Levine |
| 2003/0014176 A1 * | 1/2003 | Levine ..................... G08G 1/01 |
| | | 701/70 |

(Continued)

FOREIGN PATENT DOCUMENTS

| CN | 203480701 U | 3/2014 |
| JP | 2014096012 A * | 5/2014 |

OTHER PUBLICATIONS

Machine Translation of Yoshinori's reference (JP-2014096012-A) (Year: 2014).*

(Continued)

*Primary Examiner* — Tarek Elarabi
(74) *Attorney, Agent, or Firm* — Christopher G. Darrow; Darrow Mustafa PC

(57) ABSTRACT

Systems and methods for protecting a vehicle at an intersection are disclosed herein. One embodiment detects that the vehicle is stopped at the intersection at one of a first
(Continued)

position and a second position; detects that a driver of the vehicle is pressing on an accelerator pedal of the vehicle; delays acceleration of the vehicle automatically by a first predetermined period, when the vehicle has been detected at the first position; and delays acceleration of the vehicle automatically by a second predetermined period, when the vehicle has been detected at the second position. Delaying acceleration of the vehicle automatically prevents the vehicle from being struck by a cross-traffic vehicle that has proceeded through the intersection against a first traffic signal in a red-light state.

17 Claims, 5 Drawing Sheets

(52) U.S. Cl.
CPC ..... *B60W 2420/42* (2013.01); *B60W 2420/52* (2013.01); *B60W 2520/04* (2013.01); *B60W 2540/10* (2013.01); *B60W 2555/60* (2020.02); *B60W 2720/106* (2013.01)

(58) Field of Classification Search
CPC ......... B60W 2520/04; B60W 2540/10; B60W 2555/60; B60W 2720/106
See application file for complete search history.

(56) References Cited

U.S. PATENT DOCUMENTS

| | | |
|---|---|---|
| 2018/0190116 A1 | 7/2018 | Bauer et al. |
| 2018/0290654 A1* | 10/2018 | Jeon .................... B60W 30/181 |
| 2021/0101619 A1 | 4/2021 | Weast et al. |
| 2022/0153267 A1* | 5/2022 | Ito .................. B60W 30/18109 |

OTHER PUBLICATIONS

Richards, "Drivers Who Wait 3 Seconds at a Green Light Get Hammered: Roadshow," Mercury News, Jul. 30, 2019, found at https://www.mercurynews.com/2019/07/30/drivers-who-wait-3-seconds-at-a-red-light-get-hammered-roadshow/.
Hussain et al., "Innovative countermeasures for red light running prevention at signalized intersections: A driving simulator study", Accident Analysis and Prevention 134 105349 (2020), pp. 1-12.
Goldhammer et al., "Cooperative Multi Sensor Network for Traffic Safety Applications at Intersections" IEE Conference Sept. 16-19, 2020 pp. 1-6, https://sci-hub.scihubtw.tw/10.1109/itsc.2012.6338672.
Chawla et al., "Modified centralized approach for preventing collision at traffic intersection" IEEE Conference India Sep. 21-23, 2017, pp. 1-8, 10.1109/ISPCC.2017.8269646.
National Safety Council, Defensive Driving Responsible and Respectful Behaviors (2015), found at: https://www.nesafetycouncil.org/images/Traffic/ADD/ADD_Pt_2.pdf.

\* cited by examiner

SYSTEMS AND METHODS FOR PROTECTING A VEHICLE AT AN INTERSECTION

TECHNICAL FIELD

The subject matter described herein generally relates to vehicles and, more particularly, to systems and methods for protecting a vehicle at an intersection.

BACKGROUND

According to the U.S. National Highway Traffic Safety Administration (NHTSA), approximately 40 percent of automobile accidents occur at intersections. Among the accidents that occur at intersections, many are caused by drivers running (not stopping for) red traffic signals. Such accidents result in hundreds of fatalities each year in the U.S. alone. Though various solutions have been attempted or proposed, red-light-running accidents remain a serious problem. For example, despite the use of traffic signals that maintain a 1- to 3-second clearance period during which signals for all legs of the intersection remain red and technology that gives drivers advance warning of a traffic signal turning red, drivers still run red lights fairly frequently. The attendant risk is heightened during twilight or dusk, when visibility is poor.

SUMMARY

An example of a system for protecting a vehicle at an intersection is presented herein. The system comprises one or more processors and a memory communicably coupled to the one or more processors. The memory stores a context detection module including instructions that when executed by the one or more processors cause the one or more processors to detect that the vehicle is stopped at the intersection at one of a first position and a second position. The memory also stores an acceleration delay module including instructions that when executed by the one or more processors cause the one or more processors to detect that a driver of the vehicle is pressing on an accelerator pedal of the vehicle. The acceleration delay module also includes instructions that when executed by the one or more processors cause the one or more processors to delay acceleration of the vehicle automatically by a first predetermined period, when the vehicle has been detected at the first position. The acceleration delay module also includes instructions that when executed by the one or more processors cause the one or more processors to delay acceleration of the vehicle automatically by a second predetermined period, when the vehicle has been detected at the second position. The instructions in the acceleration delay module that when executed by the one or more processors cause the one or more processors to delay acceleration of the vehicle automatically prevent the vehicle from being struck by a cross-traffic vehicle that has proceeded through the intersection against a first traffic signal in a red-light state.

Another embodiment is a non-transitory computer-readable medium for protecting a vehicle at an intersection and storing instructions that when executed by one or more processors cause the one or more processors to detect that the vehicle is stopped at the intersection at one of a first position and a second position. The instructions also cause the one or more processors to detect that a driver of the vehicle is pressing on an accelerator pedal of the vehicle. The instructions also cause the one or more processors to delay acceleration of the vehicle automatically by a first predetermined period, when the vehicle has been detected at the first position. The instructions also cause the one or more processors to delay acceleration of the vehicle automatically by a second predetermined period, when the vehicle has been detected at the second position. Delaying acceleration of the vehicle automatically prevents the vehicle from being struck by a cross-traffic vehicle that has proceeded through the intersection against a first traffic signal in a red-light state.

Another embodiment is a method of protecting a vehicle at an intersection. The method includes detecting that the vehicle is stopped at the intersection at one of a first position and a second position. The method also includes detecting that a driver of the vehicle is pressing on an accelerator pedal of the vehicle. The method also includes delaying acceleration of the vehicle automatically by a first predetermined period, when the vehicle has been detected at the first position. The method also includes delaying acceleration of the vehicle automatically by a second predetermined period, when the vehicle has been detected at the second position. Delaying acceleration of the vehicle automatically prevents the vehicle from being struck by a cross-traffic vehicle that has proceeded through the intersection against a first traffic signal in a red-light state.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
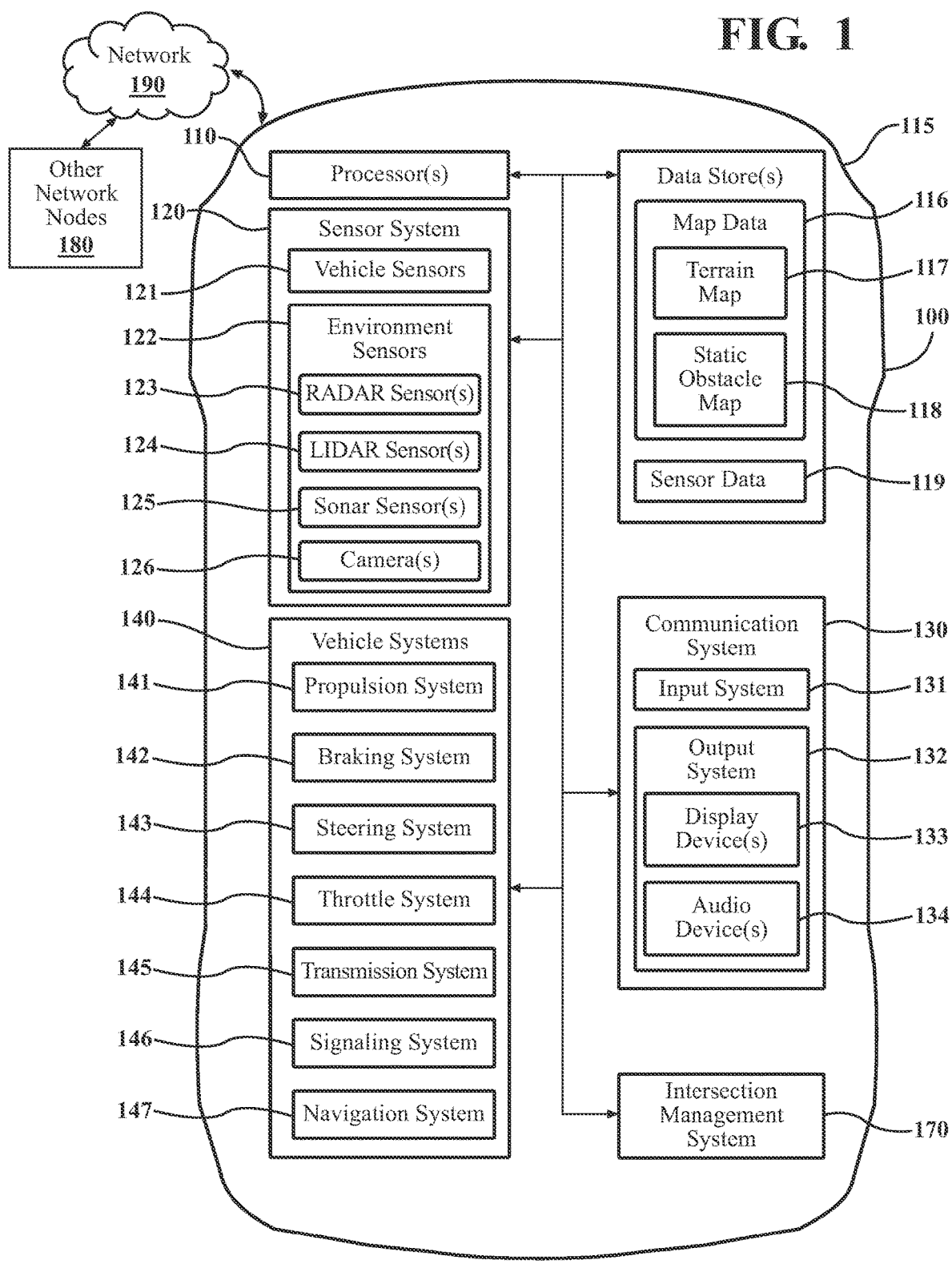
FIG. 1 illustrates one embodiment of a vehicle within which systems and methods disclosed herein may be implemented.

Various embodiments described herein protect a vehicle at an intersection by not permitting the vehicle to be the first vehicle to move after a traffic signal governing that vehicle turns green or otherwise preventing the vehicle from moving too soon. In some embodiments, this feature is included among other features in an Advanced Driver-Assistance System (ADAS) of the vehicle.

In one embodiment, the vehicle includes environment sensors that enable an intersection management system in the vehicle to detect that the vehicle is stopped for a red traffic signal at an intersection. Additionally, the environment sensors enable the system to detect that the stopped vehicle is in the first position (first in line at the intersection, closest to the intersection or stop line) or the second position (immediately behind the vehicle in the first position) at the intersection. At some time later, the system detects that the traffic signal governing the vehicle has turned green and detects that the driver is pressing on the vehicle's accelerator pedal to proceed along the driver's planned route. The system automatically and intentionally imposes a predetermined delay before the vehicle is permitted to accelerate from a dead stop, despite the governing traffic signal being green. In one embodiment, the automatic delay is 3 seconds, if the vehicle is detected as being at the first position, and 1 second, if the vehicle is detected as being at the second position. Automatically delaying acceleration in this manner prevents the vehicle from moving too soon after the traffic signal changes to green and being struck by a vehicle in cross-traffic that has run a red traffic signal.

In another embodiment, the vehicle is a legacy vehicle lacking environment sensors. In this embodiment, an intersection management system in the vehicle detects that the vehicle is stopped at an intersection in either the first position or the second position based on geolocation data pertaining to the vehicle, possibly in combination with map data. For example, the system can determine that the vehicle is stopped at the first or second position at an intersection based on global-positioning-system (GPS) data that is correlated with annotated map data. In such a situation, the system presumes that the vehicle has stopped for a red traffic signal. At some point later in time, the system detects that the driver is pressing on the vehicle's accelerator pedal to proceed along the driver's intended route—presumably because the traffic signal has turned green. The system imposes a predetermined delay before the vehicle is permitted to accelerate from a dead stop. As with the environment-sensors embodiment discussed above, automatically delaying acceleration in this manner prevents the vehicle from moving too soon and, consequently, being struck by a vehicle in cross-traffic that has run a red traffic signal.

In some embodiments, the intersection management system notifies the driver of the vehicle visually and/or audibly, when acceleration is being delayed. In some embodiments, the notification informs the driver that the purpose for the delay is to protect the driver/vehicle from a potential red-light runner.

Referring to FIG. 1, an example of a vehicle 100, in which systems and methods disclosed herein can be implemented, is illustrated. The vehicle 100 can include an intersection management system 170 or components and/or modules thereof. As used herein, a "vehicle" is any form of motorized land transport. For example, in some embodiments, the vehicle 100 is an automobile. Herein, a vehicle 100 is sometimes referred to as an "ego vehicle." An "ego vehicle" is a vehicle 100 from whose point of view an intersection management system 170 operates to protect that vehicle 100 from other vehicles (i.e., red-light runners) at an intersection. That is, in the various scenarios discussed herein, a vehicle in which an intersection management system 170 has been installed is considered to be an "ego vehicle."

In some embodiments, the vehicle 100 may include an internal combustion engine (ICE). In other embodiments, vehicle 100 may be an electric or a hybrid ICE/electric vehicle. The vehicle 100 can include the intersection management system 170 or capabilities to support or interact with the intersection management system 170 and thus benefits from the functionality discussed herein. Instances of vehicle 100, as used herein, are equally applicable to any machine capable of incorporating the systems or methods described herein.

The vehicle 100 also includes various elements. It will be understood that, in various implementations, it may not be necessary for the vehicle 100 to have all the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including intersection management system 170. While the various elements are shown as being located within the vehicle 100 in FIG. 1, it will be understood that one or more of these elements can be located external to the vehicle 100 or be part of a system that is separate from vehicle 100. Further, the elements shown may be physically separated by large distances.

Some of the possible elements of the vehicle 100 are shown in FIG. 1 and will be described in connection with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors (sometimes herein referred to as "CAN-bus sensors") that output, for example, speed and steering-angle data pertaining to vehicle 100. Sensor system 120 can also include one or more environment sensors 122. Environment sensors 122 generally include, without limitation, radar sensor(s) 123, Light Detection and Ranging (LIDAR) sensor(s) 124, sonar sensor(s) 125, and camera(s) 126. As mentioned above, in some embodiments, vehicle 100 is a legacy vehicle that does not include environment sensors 122 but includes CAN sensors, a GPS or other geolocation system, and map data 116 that intersection management system 170 uses to determine when the legacy vehicle is stopped at the first position or the second position at an intersection, as discussed above.

Communication system 130 includes an input system 131 and an output system 132. The output system 132 can include components such as one or more displays 133 and one or more audio devices 134. As explained further below, intersection management system 170 can use the display device(s) 133 and/or the audio device(s) 134, under appropriate circumstances, to notify the driver of a vehicle 100 automatically that the intersection management system 170 is delaying acceleration to protect the vehicle 100 and its occupants.

As shown in FIG. 1, vehicle 100 includes various vehicle systems 140. Among those vehicle systems 140, throttle system 144 is particularly relevant to intersection management system 170. Throttle system 144 includes an accelerator pedal (not shown in FIG. 1). Herein, a "throttle system" is a portion of vehicle 100 that controls the propulsion system 141 of vehicle 100, whether vehicle 100 is an ICE vehicle, an electric vehicle, or an ICE/electric hybrid vehicle. Similarly, herein, an "accelerator pedal" refers to the component of throttle system 144 that enables a driver to control the acceleration of vehicle 100, whether vehicle 100 is an ICE vehicle, an electric vehicle, or an ICE/electric hybrid vehicle.

As shown in FIG. 1, vehicle 100 may, in some embodiments, communicate with one or more other network nodes (servers, edge servers, infrastructure devices, other connected vehicles) 180 via a network 190. In FIG. 1, network 190 represents any of a variety of wired and wireless networks. For example, in communicating directly with another vehicle, sometimes referred to as vehicle-to-vehicle (V2V) communication, vehicle 100 can employ a technology such as dedicated short-range communication (DSRC) or Bluetooth Low Energy (BLE). In communicating with a cloud or edge server or a roadside unit (RSU), vehicle 100 can use a technology such as cellular data (LTE, 5G, 6G, etc.). In some embodiments, network 190 includes the Internet.

Figure 2:
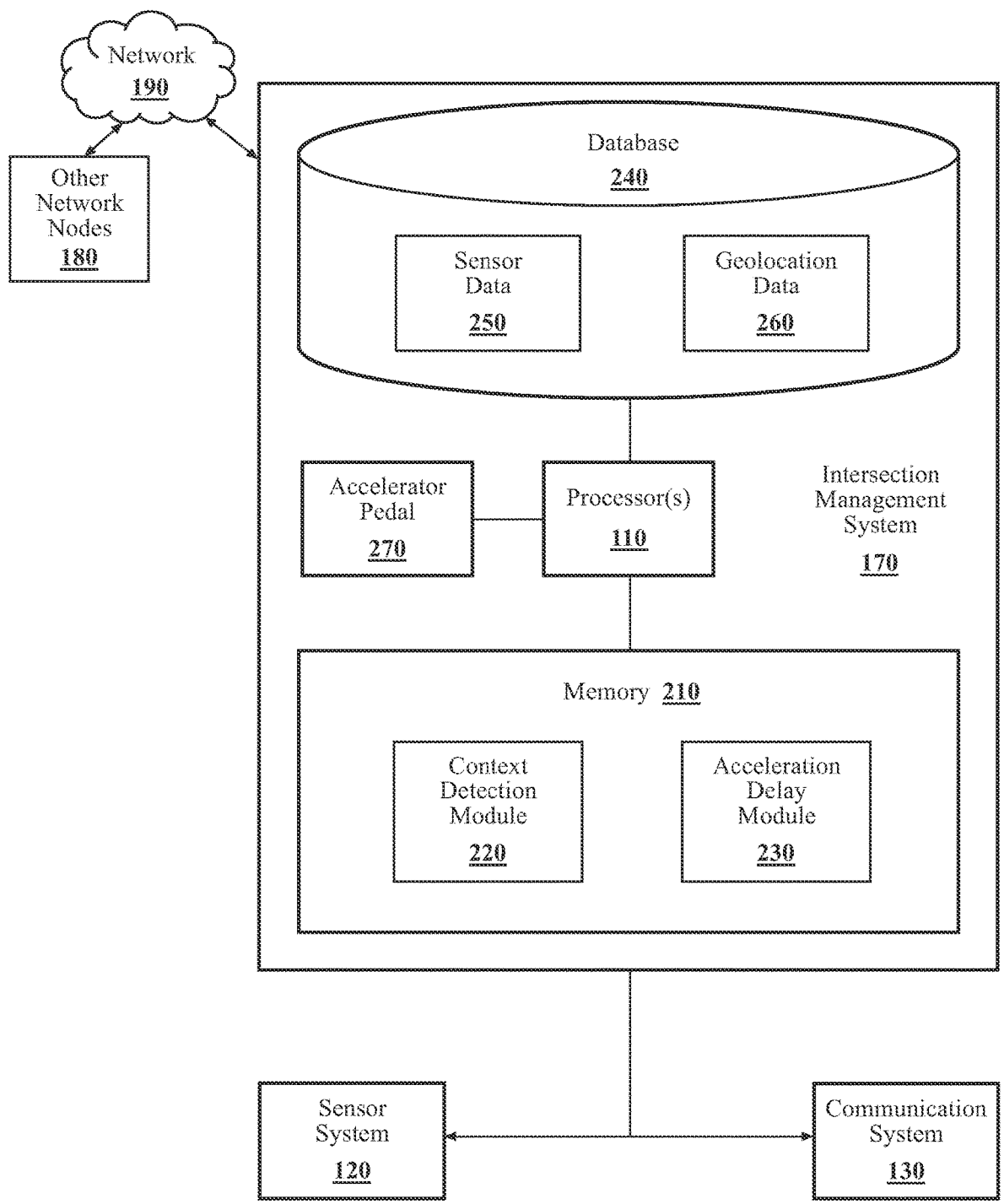
FIG. 2 illustrates one embodiment of an intersection management system.

Referring to FIG. 2, it illustrates one embodiment of an intersection management system 170. Intersection management system 170 is shown as including one or more processors 110 from the vehicle 100 of FIG. 1. Accordingly, the one or more processors 110 may be a part of the intersection management system 170, the intersection management system 170 may include a separate processor from the one or more processors 110 of the vehicle 100, or the intersection management system 170 may access the one or more processors 110 through a data bus or another communication path. In one embodiment, the intersection management system 170 includes a memory 210 that stores a context detection module 220 and an acceleration delay module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that, when executed by the one or more processors 110, cause the one or more processors 110 to perform the various functions disclosed herein.

As shown in FIG. 2, intersection management system 170, in some embodiments, can communicate with one or more other network nodes (servers, edge servers, infrastructure devices, other connected vehicles) 180 via a network 190, as discussed above in connection with FIG. 1. As also shown in FIG. 2, in some embodiments, intersection management system 170 communicates with sensor system 120 and communication system 130.

In embodiments in which vehicle 100 includes environment sensors 122, intersection management system 170 stores sensor data 250 produced by those sensors in a database 240. Intersection management system 170 can also store geolocation data 260 in database 240. Geolocation data 260 and map data 116 are particularly important in embodiments in which vehicle 100 is a legacy vehicle that lacks environment sensors 122.

Context detection module 220 generally includes instructions that when executed by the one or more processors 110 cause the one or more processors 110 to detect that a vehicle 100 is stopped at an intersection at one of a first position and a second position. In other words, context detection module 220 includes instructions that when executed by the one or more processors 110 cause the one or more processors 110 to detect that the vehicle 100 is stopped at an intersection at either a first position or a second position. These two positions are explained further below in connection with FIG. 3.

Figure 3:
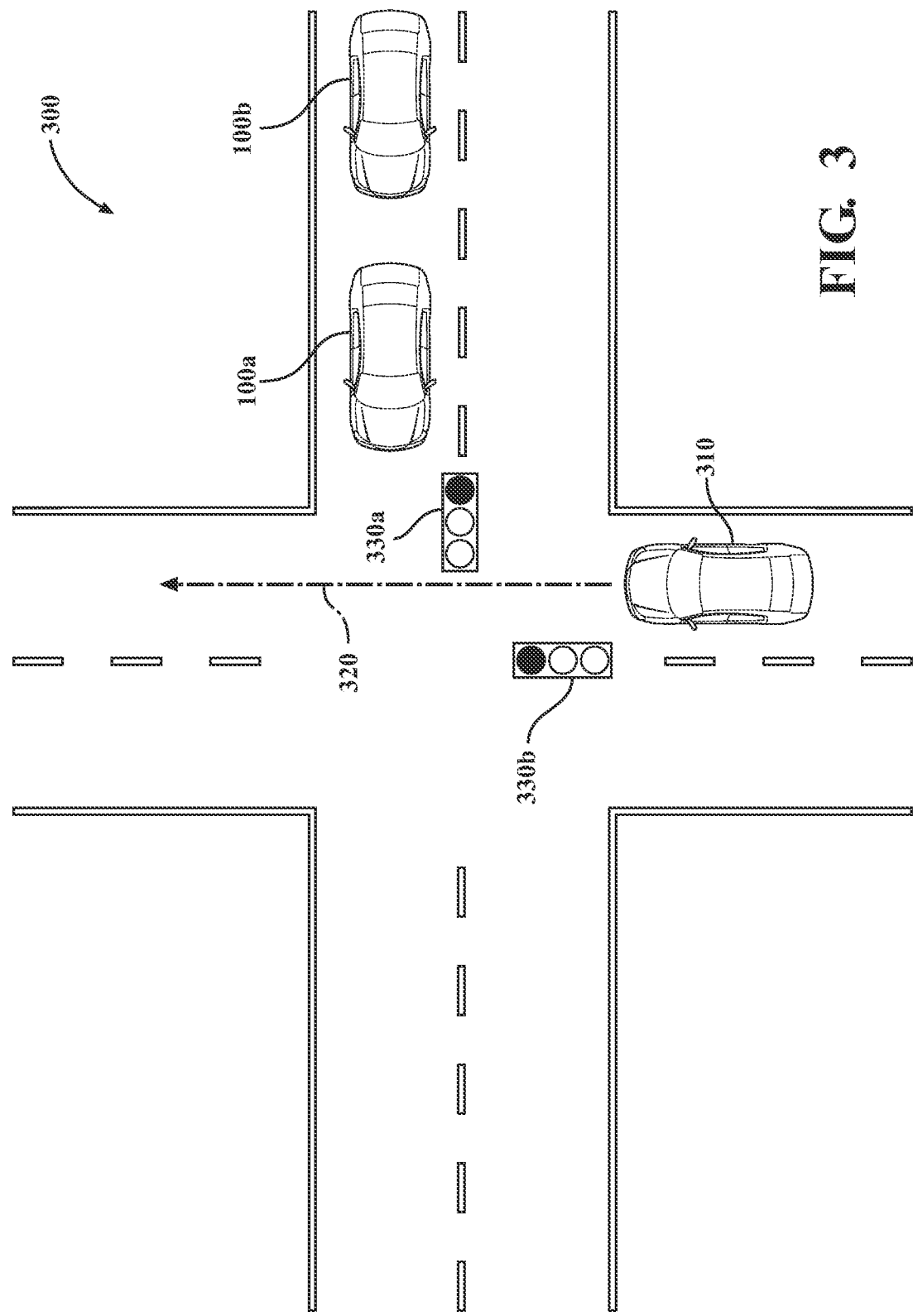
FIG. 3 illustrates an intersection at which various embodiments of an intersection management system can be deployed to protect a vehicle.

FIG. 3 illustrates an intersection 300 at which various embodiments of an intersection management system 170 can be deployed to protect a vehicle 100. FIG. 3 illustrates two different scenarios concerning an ego vehicle 100 in the context of an intersection management system 170: (1) one in which the ego vehicle 100a is in the very first position in line at the intersection (closest to the intersection or stop line); and (2) one in which the ego vehicle 100b is in the second position at the intersection—immediately behind a vehicle 100a that occupies the first position. Thus, "first position" and "second position" refer to where in line a given ego vehicle 100 is while stopped for a red traffic signal at an intersection 300. In both scenarios, the ego vehicle 100 (100a or 100b) has stopped for a traffic signal 330a that is in a red-light state. (Note that, in FIG. 3, traffic signal 330a is depicted as being in the green-light state that occurs at a later point in time.)

As explained above, the objective of intersection management system 170 is to protect the ego vehicle 100a or 100b from a cross-traffic vehicle 310 driven by a driver that has chosen to run a red light—to disregard traffic signal 330b being in a red-light state and to proceed along the trajectory 320 through the intersection 300. If the ego vehicle 100a or 100b were to proceed immediately upon the traffic signal 330a turning green, the ego vehicle 100a or 100b might be struck by cross-traffic vehicle 310 as it traverses the trajectory 320. As discussed further below, acceleration delay module 230 prevents this undesirable outcome by delaying the acceleration of the ego vehicle 100a or 100b for a predetermined period after acceleration delay module 230 has detected that the driver of ego vehicle 100a or 100b is pressing on the accelerator pedal 270.

How context detection module 220 determines that the vehicle 100 is stopped at an intersection at either the first position or the second position (refer to FIG. 3) differs, depending on the embodiment. In some embodiments, context detection module 220 can analyze data from one or more vehicle sensors 121 (e.g., CAN-bus sensors outputting the vehicle's speed), geolocation data 260, and map data 116 to detect that the vehicle 100 is at a dead stop at or near an intersection. From the geolocation data 260 and the map data 116, context detection module 220 can ascertain that vehicle 100 occupies either the first position or the second position at the intersection 300 where vehicle 100 has stopped (refer to FIG. 3 for discussion of the first and second positions). This approach can be deployed in legacy vehicles lacking environment sensors 122. In such an embodiment, intersection management system 170 can presume that vehicle 100 is stopped at the intersection in response to the traffic signal 330a governing vehicle 100 being in a red-light state. Such a presumption can be reinforced, for example, by annotated map data 116 indicating the presence of traffic signals at the intersection 300 in question.

In a different embodiment, vehicle 100 is a sensor-rich vehicle. In such an embodiment, vehicle 100 additionally includes environment sensors 122 such as camera(s) 126, LIDAR sensor(s) 124, and radar sensor(s) 123, as discussed above. In those embodiments, vehicle 100 can analyze sensor data 250 from one or more of these types of sensors to ascertain that the vehicle is first or second in line while stopped at an intersection. Further, in some embodiments, context detection module 220 can analyze sensor data 250 or other information acquired from the infrastructure via network 190, such as signal phase and timing (SPaT) data from the traffic signals at the intersection, to ascertain that the traffic signal 330*a* governing vehicle 100 is in a red-light state and that the vehicle 100 has stopped at the intersection in response to the traffic signal 330*a*. Such analysis provides a more complete situational context to intersection management system 170. This context can be used subsequently by acceleration delay module 230, as explained below.

In general, context detection module 220 can analyze sensor data 250, geolocation data 260, CAN-bus data, map data 116, and/or other information to detect that vehicle 100 has stopped at either the first position or the second position at an intersection 300.

Referring again to FIG. 2, acceleration delay module 230 generally includes instructions that when executed by the one or more processors 110 cause the one or more processors 110 to detect that the driver of the vehicle 100 is pressing on the accelerator pedal 270 of the vehicle 100. This occurs after the traffic signal 330*a* governing vehicle 100 has changed from the red-light state to the green-light state and the driver of vehicle 100 is attempting to proceed along the planned route (e.g., to proceed straight through the intersection 300, to turn left, or to turn right). In sensor-rich embodiments, acceleration delay module 230 includes instructions to analyze sensor data 250 and/or SPaT data to determine that the traffic signal 330*a* has changed from the red-light state to the green-light state before acceleration delay module 230 detects that the driver of vehicle 100 has begun pressing on the accelerator pedal 270. In legacy-vehicle embodiments, acceleration delay module 230 detects that the driver is pressing on the accelerator sometime after a full stop and an indefinite waiting period. In such an embodiment, acceleration delay module 230 presumes that the reason for the driver's attempted acceleration is that traffic signal 330*a* has changed state from red to green.

In some embodiments, accelerator pedal 270 is a drive-by-wire pedal that electronically controls propulsion system 141 via throttle system 144 and the one or more processors 110. In other embodiments, accelerator pedal 270 is a conventional mechanical pedal. In either case, accelerator pedal 270 includes a mechanism (e.g., a pressure sensor or an angle sensor) that enables acceleration delay module 230 to detect when the driver of vehicle 100 is pressing on the accelerator pedal 270 and to what extent.

Acceleration delay module 230 includes additional instructions that when executed by the one or more processors 110 cause the one or more processors 110 to do one of two things, depending on which position (first or second) the vehicle 100 has been detected, by context detection module 220, to occupy at the intersection 300. If context detection module 220 detects that vehicle 100 is at the first position, acceleration delay module 230 automatically delays acceleration of vehicle 100 by a first predetermined period. If context detection module 220 detects that vehicle 100 is at the second position, acceleration delay module 230 automatically delays acceleration of vehicle 100 by a second predetermined period. In either case, despite the driver pressing on the accelerator pedal 270 in an attempt to proceed along the planned route, acceleration delay module 230 automatically prevents vehicle 100 from moving until the predetermined period has elapsed. In other words, acceleration delay module 230 automatically delays acceleration by the predetermined period. This delayed acceleration can be implemented via the one or more processors 110 under software or firmware control, in some embodiments. In other embodiments, such a delay can be implemented using an electric circuit or electromechanical apparatus included in throttle system 144 with which acceleration delay module 230 interfaces.

In some embodiments, the first predetermined period is longer than the second predetermined period. This recognizes that a vehicle 100 in the second position cannot be the first vehicle to begin moving (for any significant distance, at least) immediately after the traffic signal 330*a* turns green. Therefore, a vehicle 100 in the second position is unavoidably delayed by the vehicle preceding it in the first position, meaning that the second predetermined period can be shorter than it would be for a vehicle 100 in the first position. In one embodiment, the first predetermined period is 3 seconds, and the second predetermined period is 1 second. These values are simply examples. For example, the first predetermined period could just as easily be 2 seconds, depending on the particular embodiment.

As discussed above, the delayed acceleration caused by acceleration delay module 230 automatically prevents the vehicle 100 from being struck by a cross-traffic vehicle 310 that has proceeded through the intersection 300 against a traffic signal 330*b* that is in a red-light state. In other words, intersection management system 170 imposes an automatic "look-before-you-leap" policy that prevents vehicle 100 from moving too quickly after traffic signal 330*a* changes from the red-light state to the green-light state, thereby protecting vehicle 100 and its occupants from a red-light-running cross-traffic vehicle 310.

In some embodiments, acceleration delay module 230 includes additional instructions that when executed by the one or more processors 110 cause the one or more processors 110 to notify, automatically, the driver of the vehicle 100 of delayed acceleration, when it occurs. For example, when acceleration delay module 230 delays acceleration, as discussed above, acceleration delay module 230 can cause a message such as, "Lookout for possible red-light runner! Waiting 3 seconds" to be displayed on a display device 133 and/or to be emitted audibly via an audio device 134. This informs the driver of the reason for the delayed acceleration, preventing the driver from thinking the vehicle's throttle system 144 might be malfunctioning. Such a notification also increases the driver's awareness of the risks of taking off too quickly after a traffic signal changes from red to green.

In some embodiments, the features described herein pertaining to intersection management system 170 can optionally be turned on or off by the driver of vehicle 100 via the vehicle's settings menu. In other embodiments, the vehicle's user interface does not permit the driver to disable intersection management system 170. As mentioned above, in some embodiments, intersection management system 170 is one facet of an ADAS that includes other features such as blind-spot detection, parking assistance, lane-change assistance, collision avoidance in contexts other than intersections and red-light runners, etc.

Figure 4:
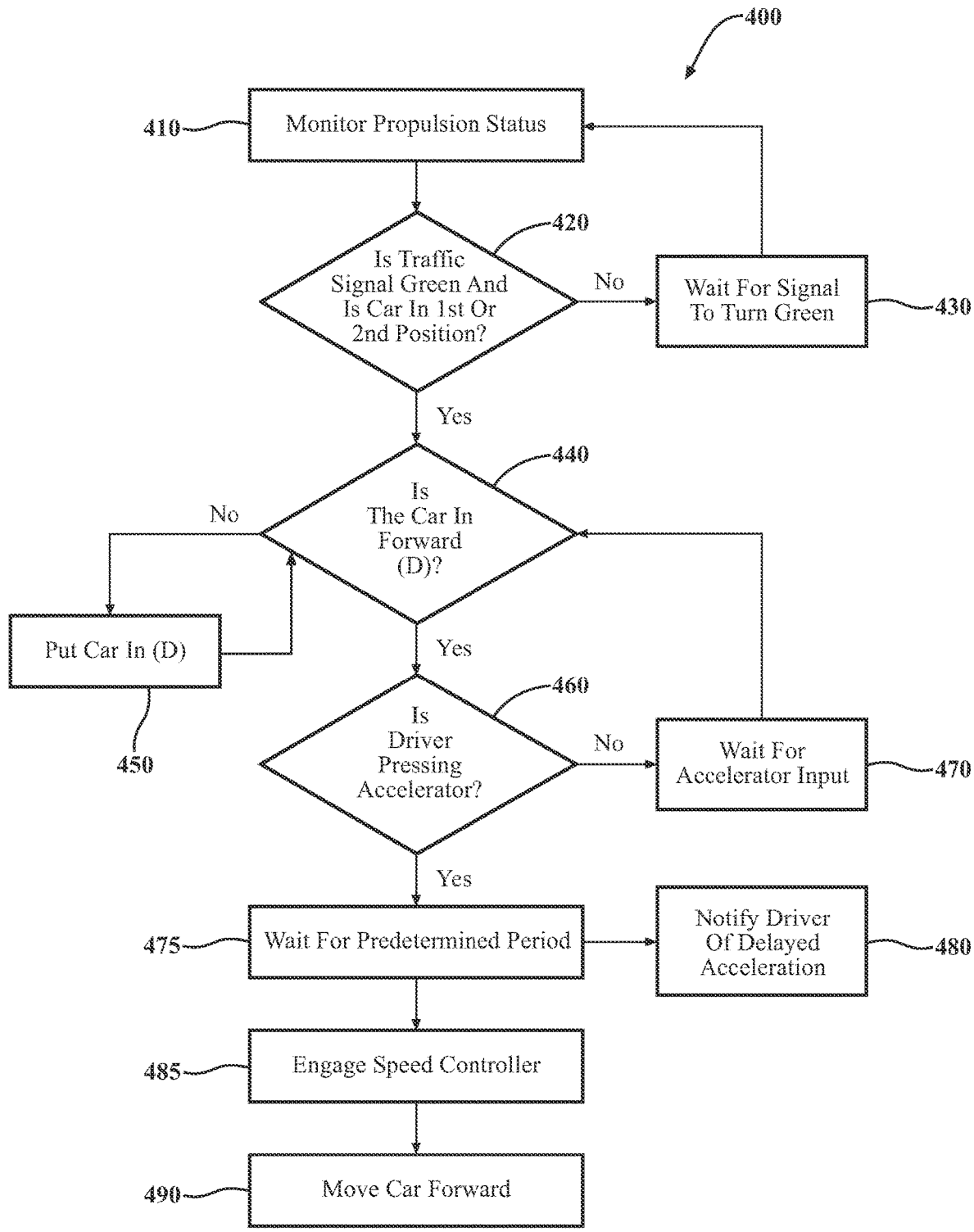
FIG. 4 is a flowchart of the logic employed by one embodiment of an intersection management system, in accordance with an illustrative embodiment of the invention.

FIG. 4 is a flowchart of the logic employed by one embodiment of an intersection management system 170, in accordance with an illustrative embodiment of the invention. Method 400 will be discussed from the perspective of the intersection management system 170 shown in FIG. 2. While method 400 is discussed in combination with intersection management system 170, it should be appreciated that method 400 is not limited to being implemented within intersection management system 170, but intersection management system 170 is instead one example of a system that may implement method 400. Method 400 corresponds to what is described above as a sensor-rich embodiment.

At block 410, context detection module 220 begins monitoring the propulsion status of vehicle 100 (whether vehicle 100 is moving or stopped, etc.). At some point in time, context detection module 220 detects that vehicle 100 is stopped at an intersection 300 at either the first position or the second position, as discussed above in connection with FIG. 3. In some embodiments, context detection module 220 additionally detects that the vehicle 100 is stopped at the intersection 300 at the first position or the second position in response to a traffic signal 330a being in a red-light state. As discussed above, context detection module 220 can make these determinations by analyzing sensor data 250 from one or more environment sensors 122, geolocation data 260, map data 116, and/or SPaT data from the traffic signals 330 at the intersection 300.

At block 420, acceleration delay module 230 detects whether the traffic signal 330a has changed to a green-light state and determines whether vehicle 100 is in the first or second position at the intersection 300 based on the output of context detection module 220, as discussed above. If the traffic signal 330a has not yet turned green, acceleration delay module 230 waits for the traffic signal 330a to turn green at block 430. Otherwise, control proceeds to block 440.

At block 440, acceleration delay module 230 determines whether vehicle 100 is in "Drive" (D). If not, vehicle 100 is placed in the "Drive" state at 450 through suitable input to transmission system 145. If so, acceleration delay module 230 determines, at block 460, whether the driver is pressing the accelerator pedal 270. If not, acceleration delay module 230 waits for accelerator input at block 470. If the driver is pressing the accelerator pedal 270 at block 460, acceleration delay module 230 delays acceleration by a predetermined period at block 475 to protect the vehicle 100 and its occupants from a potential red-light runner (see, e.g., the red-light-running cross-traffic vehicle 310 in FIG. 3). As discussed above, the duration of the period by which acceleration is delayed depends on whether vehicle 100 is in the first position or the second position at the intersection 300. In some embodiments, the predetermined period is longer for a vehicle 100 in the first position (e.g., 3 seconds) than for a vehicle 100 in the second position (e.g., 1 second).

At block 480, acceleration delay module 230 notifies the driver of the delayed acceleration, as discussed above. At block 485, acceleration delay module 230 engages the speed controller of vehicle 100 (throttle system 144) so that vehicle 100 can proceed to move forward along the driver's planned route at block 490.

Figure 5:
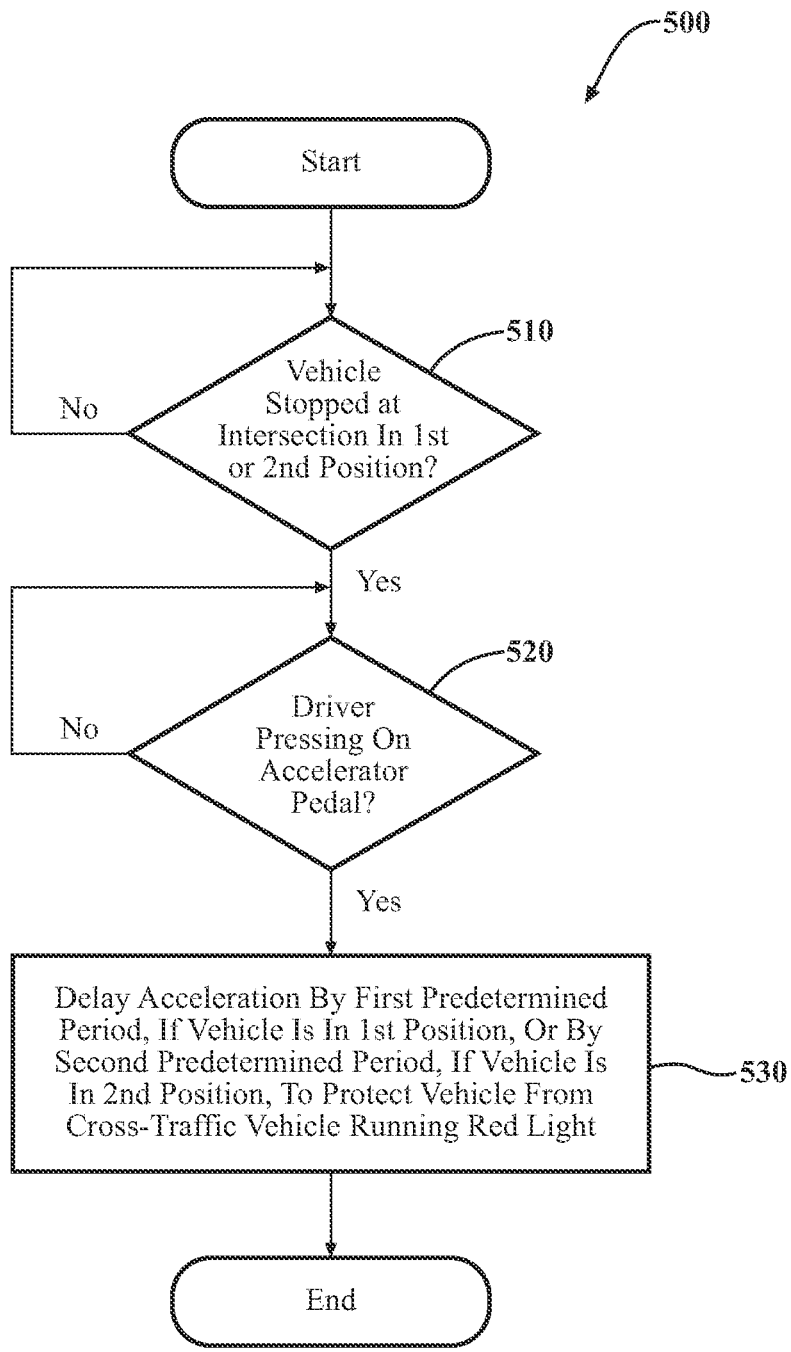
FIG. 5 is a flowchart of a method of protecting a vehicle at an intersection, in accordance with an illustrative embodiment of the invention.

FIG. 5 is a flowchart of a method 500 of protecting a vehicle at an intersection 300, in accordance with an illustrative embodiment of the invention. Method 500 will be discussed from the perspective of the intersection management system 170 shown in FIG. 2. While method 500 is discussed in combination with intersection management system 170, it should be appreciated that method 500 is not limited to being implemented within intersection management system 170, but intersection management system 170 is instead one example of a system that may implement method 500. Method 500 encompasses both sensor-rich and legacy-vehicle embodiments of an intersection management system 170. The differences between these embodiments are discussed in detail above.

At block 510, context detection module 220 detects that a vehicle 100 is stopped at an intersection 300 at either a first position or a second position. As discussed above, context detection module 220 can accomplish this by analyzing CAN-bus data (e.g., the output of vehicle speed sensors), geolocation data 260 pertaining to the vehicle 100, and map data 116. In sensor-rich embodiments, context detection module 220 detects the movement and positional status of vehicle 100 at an intersection 300 by analyzing sensor data 250 from one or more environment sensors 122, possibly in combination with analyzing at least some of the other kinds of data just mentioned.

At block 520, acceleration delay module 230 detects that the driver of the vehicle 100 is pressing on the accelerator pedal 270 of the vehicle 100. This signals to acceleration delay module 230 that the driver intends to proceed along the planned route, whether it be to drive straight through the intersection or to turn right or left at the intersection.

At block 530, acceleration delay module 230 automatically delays acceleration by a first predetermined period, when the vehicle 100 has been detected at the first position by context detection module 220. Alternatively, acceleration delay module 230 automatically delays acceleration by a second predetermined period, when the vehicle 100 has been detected at the second position by context detection module 220. As explained above, in some embodiments, the first predetermined period is longer than the second predetermined period. For example, in one embodiment, the first predetermined period is 3 seconds, and the second predetermined period is 1 second. As explained above, automatically delaying acceleration prevents the vehicle 100 from being struck by a cross-traffic vehicle 310 that has proceeded through the intersection 300 against a traffic signal 330b that is in a red-light state.

In some embodiments, method 500 includes additional actions that are not included in the flowchart of FIG. 5. For example, in some embodiments, method 500 includes the context detection module 220 detecting that the vehicle 100 is stopped at the intersection 300 at the first or second position in response to a traffic signal 330a governing vehicle 100 being in a red-light state. In some embodiments, method 500 includes the acceleration delay module 230 detecting, prior to detecting that the driver of the vehicle 100 is pressing on the accelerator pedal 270 of the vehicle 100, that the traffic signal 330a has changed from the red-light state to the green-light state. In some embodiments, the context detection module's (220) detecting that the vehicle 100 is stopped at the intersection 300 at the first or second position includes analyzing sensor data 250 from environment sensors 122 installed in the vehicle 100. In some embodiments, the context detection module's (220) detecting that the vehicle 100 is stopped at the intersection 300 at the first or second position includes analyzing geolocation data 260 pertaining to the vehicle 100. In some embodiments, method 500 also includes acceleration delay module 230 automatically notifying the driver of the vehicle 100 of the delayed acceleration via a display device 133 and/or an audio device 134, as discussed above.

FIG. 1 will now be discussed in full detail as an example vehicle environment within which the systems and methods disclosed herein may be implemented. The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with other road users (ORUs), or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

As discussed above, the sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

As discussed above, a vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 can be operatively connected to communicate with the various vehicle systems 140 and/or individual components thereof. For example, returning to FIG. 1, the one or more processors 110 can be in communication to send and/or receive information from the various vehicle systems 140 to control the movement, speed, maneuvering, heading, direction, etc. of the vehicle 100. The one or more processors 110 may control some or all of these vehicle systems 140.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-5, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for protecting a vehicle at an intersection, the system comprising:
   one or more processors; and
   a memory communicably coupled to the one or more processors and storing:
   a context detection module including instructions that when executed by the one or more processors cause the one or more processors to detect that the vehicle is stopped at the intersection at one of a first position and a second position; and
   an acceleration delay module including instructions that when executed by the one or more processors cause the one or more processors to:
   detect that a driver of the vehicle is pressing on an accelerator pedal of the vehicle;
   delay acceleration of the vehicle automatically by a first predetermined period, when the vehicle has been detected at the first position; and
   delay acceleration of the vehicle automatically by a second predetermined period, when the vehicle has been detected at the second position, wherein the first predetermined period is longer than the second predetermined period;

wherein the instructions in the acceleration delay module that when executed by the one or more processors cause the one or more processors to delay acceleration of the vehicle automatically prevent the vehicle from being struck by a cross-traffic vehicle that has proceeded through the intersection against a first traffic signal in a red-light state.

2. The system of claim 1, wherein:

the context detection module includes further instructions that when executed by the one or more processors cause the one or more processors to detect that the vehicle is stopped at the intersection at one of the first position and the second position in response to a second traffic signal being in a red-light state; and the acceleration delay module includes further instructions that when executed by the one or more processors cause the one or more processors to detect, prior to detecting that the driver of the vehicle is pressing on the accelerator pedal of the vehicle, that the second traffic signal has changed from the red-light state to a green-light state.

3. The system of claim 1, wherein the first predetermined period is three seconds and the second predetermined period is one second.

4. The system of claim 1, wherein the instructions in the context detection module to detect that the vehicle is stopped at the intersection at one of the first position and the second position include instructions that when executed by the one or more processors cause the one or more processors to analyze sensor data from environment sensors installed in the vehicle, the environment sensors including one or more of cameras, Light Detection and Ranging sensors, and radar sensors.

5. The system of claim 1, wherein the instructions in the context detection module to detect that the vehicle is stopped at the intersection at one of the first position and the second position include instructions that when executed by the one or more processors cause the one or more processors to analyze geolocation data pertaining to the vehicle.

6. The system of claim 1, wherein the acceleration delay module includes further instructions that when executed by the one or more processors cause the one or more processors to notify, automatically, the driver of the vehicle of delayed acceleration.

7. A non-transitory computer-readable medium for protecting a vehicle at an intersection and storing instructions that when executed by one or more processors cause the one or more processors to:

detect that the vehicle is stopped at the intersection at one of a first position and a second position;

detect that a driver of the vehicle is pressing on an accelerator pedal of the vehicle;

delay acceleration of the vehicle automatically by a first predetermined period, when the vehicle has been detected at the first position; and delay acceleration of the vehicle automatically by a second predetermined period, when the vehicle has been detected at the second position, wherein the first predetermined period is longer than the second predetermined period;

wherein delaying acceleration of the vehicle automatically prevents the vehicle from being struck by a cross-traffic vehicle that has proceeded through the intersection against a first traffic signal in a red-light state.

8. The non-transitory computer-readable medium of claim 7, wherein the instructions include further instructions that when executed by the one or more processors cause the one or more processors to:

detect that the vehicle is stopped at the intersection at one of the first position and the second position in response to a second traffic signal being in a red-light state; and detect, prior to detecting that the driver of the vehicle is pressing on the accelerator pedal of the vehicle, that the second traffic signal has changed from the red-light state to a green-light state.

9. The non-transitory computer-readable medium of claim 7, wherein the instructions to detect that the vehicle is stopped at the intersection at one of the first position and the second position include instructions that when executed by the one or more processors cause the one or more processors to analyze sensor data from environment sensors installed in the vehicle, the environment sensors including one or more of cameras, Light Detection and Ranging sensors, and radar sensors.

10. The non-transitory computer-readable medium of claim 7, wherein the instructions to detect that the vehicle is stopped at the intersection at one of the first position and the second position include instructions that when executed by the one or more processors cause the one or more processors to analyze geolocation data pertaining to the vehicle.

11. The non-transitory computer-readable medium of claim 7, wherein the instructions include further instructions that when executed by the one or more processors cause the one or more processors to notify, automatically, the driver of the vehicle of delayed acceleration.

12. A method of protecting a vehicle at an intersection, the method comprising:

detecting that the vehicle is stopped at the intersection at one of a first position and a second position;

detecting that a driver of the vehicle is pressing on an accelerator pedal of the vehicle;

delaying acceleration of the vehicle automatically by a first predetermined period, when the vehicle has been detected at the first position; and delaying acceleration of the vehicle automatically by a second predetermined period, when the vehicle has been detected at the second position, wherein the first predetermined period is longer than the second predetermined period;

wherein delaying acceleration of the vehicle automatically prevents the vehicle from being struck by a cross-traffic vehicle that has proceeded through the intersection against a first traffic signal in a red-light state.

13. The method of claim 12, further comprising:

detecting that the vehicle is stopped at the intersection at one of the first position and the second position in response to a second traffic signal being in a red-light state; and detecting, prior to detecting that the driver of the vehicle is pressing on the accelerator pedal of the vehicle, that the second traffic signal has changed from the red-light state to a green-light state.

14. The method of claim 12, wherein the first predetermined period is three seconds and the second predetermined period is one second.

15. The method of claim 12, wherein the detecting that the vehicle is stopped at the intersection at one of the first position and the second position includes analyzing sensor data from environment sensors installed in the vehicle, the environment sensors including one or more of cameras, Light Detection and Ranging sensors, and radar sensors.

16. The method of claim 12, wherein the detecting that the vehicle is stopped at the intersection at one of the first position and the second position includes analyzing geolocation data pertaining to the vehicle.

17. The method of claim 12, further comprising automatically notifying the driver of the vehicle of delayed acceleration.

\* \* \* \* \*